2,848,418

LUBRICATING COMPOSITIONS

Werner Müller, Koln, and Roderich Raue, Leverkusen, Germany, assignors to Farbenfabriken Bayer Aktiengesellschaft, Leverkusen, Germany, a corporation of Germany No Drawing. Application April 14, 1954
Serial No. 423,220

Claims priority, application Germany April 16, 1953

10 Claims. (Cl. 252—51.5)

The present invention relates to lubricating compositions; more particularly it concerns lubricating compositions containing a lubricant and an amide derived from an amine and an aromatic ortho-hydroxy-carboxylic acid.

The lubricating compositions of the invention are very stable under storage conditions and to oxidizing influences so that they can be used with special advantage in internal combustion engines, in gearing systems, as cutting fluids for machine cutting tools, as turbine oils or transformer oils or in other operations where lubricants are employed.

The term "lubricant" as used throughout the specification and claims is intended to refer to an oil or fat as it is or may be used as lubricating agent, in the first line it means a mineral oil; the term "aromatic ortho-hydroxy-carboxylic acid" includes the ortho-hydroxy-carboxylic acids per se and the substitution products of the ortho-hydroxy-carboxylic acids containing for instance an alkyl group, a halogen or a further hydroxyl group, the amine is especially a primary amine, preferably an amine whose nitrogen atom is linked to a secondary or tertiary carbon atom.

The amides of aromatic ortho-hydroxy-carboxylic acids forming part of the lubricating compositions of the invention are more or less weakly colored compounds which are easily accessible; they are easily soluble and highly active in oils and fats and are thus distinguished from the known additives to lubricants, which do not possess all these advantages at the same rate.

The amounts of the amides to be added to the lubricants can easily be determined by preliminary tests; in general, 1–5 parts of the amide are sufficient for 1000 parts of the lubricant, but the amounts may often be varied within wide limits. Instead of uniform amides, also mixtures of amides may be employed according to the invention.

The amides of aromatic ortho-hydroxy-carboxylic acids can be obtained by any suitable manner, for instance by reacting ortho-hydroxy-carboxylic acid halides with the relevant amines at a molecular ratio of 1:2 in the presence or in the absence of a solvent or diluent at normal or elevated temperature; in this reaction one molecular part of the amines forms a salt with the hydrogen halide which is split off; in many cases, it is also possible to obtain the amides of the aromatic ortho-hydroxy-carboxylic acids by heating the aromatic ortho-hydroxy-carboxylic acids as such with the amines in the presence or in the absence of high boiling solvents or diluents, if necessary with the aid of compounds binding the water formed during the reaction. The amides obtained can easily be purified by distilling off first any solvents or diluents, removing any hydrogen halide with water or aqueous sodium hydroxide and distilling off the water, whereupon the amides themselves are subjected to fractional distillation in vacuo.

Aromatic ortho-hydroxy-carboxylic acids suitable as acid components of the amides forming part of the lubricating compositions are for instance salicylic acid, 3-chloro-2-hydroxy-benzoic acid, 5-chloro-2-hydroxy-benzoic acid, 3-methyl-2-hydroxy-benzoic acid, 5-chloro-3-methyl-2-hydroxy-benzoic acid, β- or γ-resorcylic acid, 2-hydroxy-1-naphthoic acid, 1-hydroxy-2-naphthoic acid, 3-hydroxy-2-naphthoic acid and 4-chloro-3-hydroxy-2-naphthoic acid.

Suitable amines which may be employed for the formation of the amide component of the lubricating compositions of the present invention are for instance isopropylamine, 2-aminobutane, 3,3-dimethyl-2-aminobutane, 2,4-dimethyl-3-aminopentane, cyclohexylamine, 2-aminoheptane, 2-aminooctane, and the amines obtained by ketonizing the fatty acid produced in the oxidation of paraffines and subsequently aminizing the reaction products by means of ammonia and hydrogen.

The following examples serve to illustrate the present invention without, however, limiting the scope thereof; the parts given are by weight.

Example 1

2 parts of the amide of an aromatic ortho-hydroxy-carboxylic acid described below are dissolved with stirring in 1000 parts of a mineral oil; the oil proves to be very stable against oxidizing influences.

The amide is prepared as follows:

62 parts of 5-chloro-3-methyl-2-hydroxy benzoic acid are added within an hour while stirring to a mixture of 50 parts of thionyl chloride and 75 parts of benzene heated to 90° C. The reaction mixture is heated at 90–100° C. for 22 hours and kept at 90–100° C. for a further 25 hours after the addition of 20 parts of thionyl chloride. Thereupon the solution is evaporated in vacuo until all the thionyl chloride is evaporated, and then diluted with 100 parts of benzene. While stirring and cooling the solution so that the temperature does not exceed 30° C., 106 parts of a paraffin amine containing a chain in the molecule of about 10 carbon atoms and bearing the amino group approximately in the middle of the chain are added. The reaction mixture is heated on the water bath for an hour to complete the formation of the amide. After cooling the solution at normal temperature it is shaken first with dilute sodium hydroxide solution and then with water. Thereupon the benzene and non-consumed paraffin amine are distilled off in a low vacuo; the paraffin amide of the 5-chloro-3-methyl-2-hydroxy-benzoic acid is obtained by distillation in a high vacuo in the form of a light-yellow oil having a boiling point of 175–193° C. at 0.6 mm. Hg.

Composition: $C_{18}H_{28}O_2NCl$. Calculated for: C, 66.4%; H, 8.62%; O, 9.85%; N, 4.32%; Cl, 10.78%. Found: C, 66.3%; H, 8.55%; O, 10.60%; N, 4.45%; Cl, 10.60%.

Instead of the amide of the ortho-hydroxy-carboxylic acid described above, the following amides may be used in the lubricating compositions.

| Amide obtained from | Melting Point in ° C. | Boiling Point in ° C. and mm. Hg | Summation Formula acc. to analysis |
|---|---|---|---|
| salicylic acid and a mixture of amines with a carbon chain having, on an average, 10 carbon atoms. | ---------- | 170–196° C./2.4 mm_____ | $C_{17}H_{27}O_2N$ |
| 5-chloro-2-hydroxy-benzoic acid and a mixture of amines with a carbon chain having, on an average, 10 carbon atoms. | ---------- | 174–202° C./0.9 mm_____ | $C_{17}H_{26}O_2NCl$ |
| 5-chloro-2-hydroxy-benzoic acid and a mixture of amines with a carbon chain having, on an average, 15 carbon atoms. | ---------- | 198–232° C./0.8 mm_____ | $C_{22}H_{36}O_2NCl$ |
| 3-methyl-2-hydroxy-benzoic acid and a mixture of amines with a carbon chain having, on an average, 15 carbon atoms. | ---------- | 183–233° C./1.1 mm_____ | $C_{23}H_{39}O_2N$ |
| 5-chloro-3-methyl-2-hydroxy-benzoic acid and a mixture of amines with a carbon chain having, on an average, 15 carbon atoms. | ---------- | 182–232° C./0.7 mm_____ | $C_{23}H_{38}O_2NCl$ |
| 5-chloro-3-methyl-2-hydroxy-benzoic acid and the mixture of 2-heptylamine and 2-octylamine. | ---------- | 172–191° C./0.8 mm_____ | $C_{15.5}H_{23}O_2NCl$ |
| 5-chloro-3-methyl-2-hydroxy-benzoic acid and 4 heptylamine. | 129–130__ | 189–194° C./1.6 mm_____ | $C_{15}H_{22}O_2NCl$ |
| 5-chloro-3-methyl-2-hydroxy-benzoic acid and 2,4-dimethyl-3-aminopentane. | 134–136__ | 150–162° C./0.6 mm_____ | $C_{15}H_{22}O_2NCl$ |
| 5-chloro-3-methyl-2-hydroxy-benzoic-acid and 3,3-dimethyl-2-aminobutane. | 85–87____ | 164–168° C./0.5 mm_____ | $C_{14}H_{20}O_2NCl$ |
| 5-chloro-3-methyl-2-hydroxy-benzoic acid and cyclohexylamine. | 145–146__ | 174–194° C./0.8 mm_____ | $C_{14}H_{18}O_2NCl$ |
| 5-chloro-3-methyl-2-hydroxy-benzoic acid and 2-butyl-amine. | 87–88____ | 155–167° C./0.8 mm_____ | $C_{12}H_{16}O_2NCl$ |
| 3-chloro-2-hydroxy-benzoic acid and a mixture of amines with a carbon chain having on an average, 15 carbon atoms. | ---------- | 193–235° C./0.5 mm_____ | $C_{22}H_{36}O_2NCl$ |

These amines of ortho-hydroxy-carboxylic acids can be obtained in a manner analogous to that described above; if desired, the chloride of the ortho-hydroxy-carboxylic acid is purified by distillation in vacuo prior to the reaction with the amine.

*Example 2*

1000 parts of a gear oil are stirred with 2 parts of the amide of 3-hydroxy-2-naphthoic acid described below until complete solution occurs; the stability of the oil against influences is greatly improved.

The amide of 3-hydroxy-2-naphthoic acid is prepared in the following manner:

65.5 parts of thionyl chloride are dropped quickly at 80° C. with stirring into a mixture of 94 parts of 3-hydroxy-2-naphthoic acid, 100 parts of toluene and 0.3 part of aluminium chloride. The reaction mixture is kept at 80° C. for 2 hours whereby the acid is dissolved. The solution is then filtered off from the little residue left and cooled to 0° C. The chloride of the 3-hydroxy-2-naphthoic acid separates in the form of a yellow colored crystal mass; it is filtered off, washed with little toluene and then with abundant ligroine and dried.

20.6 parts of the chloride obtained are dissolved in 75 parts of benzene and the solution is slowly mixed while stirring with 22.6 parts of 2,4-dimethyl-3-aminopentane of the boiling point of 124–126° C.; in this reaction the temperature should not exceed 30° C. By further working up the reaction mixture according to Example 1, the corresponding amide of the 3-hydroxy-2-naphthoic acid is obtained as light-yellow oil of the boiling point 207–215° C. at 1.4 mm. Hg, which solidifies to light-yellow crystals which can be obtained colorless by recrystallizing from alcohol. M. P.: 157–159° C. Composition: $C_{18}H_{23}O_2N$.

Instead of the amide obtained from 3-hydroxy-2-naphthoic acid and 2,4-dimethyl-3-aminopentane, the following amides may be used as components for the lubricating compositions: the amides in an analogous manner from the same acid and 2-aminobutane, cyclohexylamine, 2 - aminoheptane, 4 - aminoheptane, 2 - aminooctane or amines obtained by ketonizing the fatty acids formed in the forerun of the Fischer-Tropsch synthesis and subsequently aminizing the reaction products. Further characteristics of these amides are given below.

| Amide obtained from | Melting Point in ° C. | Boiling Point in ° C. and mm. Hg | Summation Formula acc. to analysis |
|---|---|---|---|
| 3-hydroxy-2-naphthoic acid and 2-amino-butane_____ | 119–121__ | 195–201° C./1 mm_____ | $C_{15}H_{17}O_2N$ |
| 3-hydroxy-2-naphthoic acid and cyclohexylamine__ | 168–169__ | 232–236° C./1.4 mm_____ | $C_{17}H_{19}O_2N$ |
| 3-hydroxy-2-naphthoic acid and 4-amino-heptane____ | 121–123__ | 220–223° C./0.8 mm_____ | $C_{18}H_{23}O_2N$ |
| 3-hydroxy-2-naphthoic acid and a mixture of 2-aminoheptane and 2-aminooctane. | ---------- | 218–225° C./1 mm_____ | $C_{18.5}H_{24}O_2N$ |
| 3-hydroxy-2-naphthoic acid and a mixture of amines with a carbon chain having on the average 10 carbon atoms. | ---------- | 240–262° C./1.5 mm_____ | $C_{21}H_{29}O_2N$ |
| 3-hydroxy-2-naphthoic acid and a mixture of amines with a carbon chain having on the average 15 carbon atoms. | ---------- | 200–260° C./1.3 mm_____ | $C_{26}H_{39}O_2N$ |
| 2-hydroxy-1-naphthoic acid and a mixture of amines with a carbon chain having on the average 10 carbon atoms. | ---------- | 142–178° C./0.85 mm____ | $C_{21}H_{29}O_2N$ |

*Example 3*

1000 parts of a mineral oil are mixed while stirring with 2 parts of an amide of 3-methyl-2-hydroxy-benzoic acid which is prepared in the following manner:

A mixture is made from 100 parts of xylene, 50 parts of 3-methyl-2-hydroxy-benzoic acid and 53 parts of a paraffin amine whose molecule has a chain of approximately 10 carbon atoms and bears the amino group approximately in the middle of the chain; such a paraffin amine can be obtained by ketonizing fatty acids of 4–6 carbon atoms and aminizing the reaction products by means of ammonia and hydrogen. Into this mixture 50 parts of thionyl chloride are dropped at 90–95° C. within 3 hours. Thereupon the temperature is gradually raised to 190° C. in the course of 6 hours and the reaction mixture stirred at this temperature for a further 24 hours. Finally, the mixture is distilled. At 1.1 mm. Hg and 174–201° C., a light-yellow oil is obtained; its composition corresponds to the summation formula $C_{18}H_{29}O_2N$.

Calculated for: C, 74.3%; H, 9.97%; O, 11.0%; N, 4.82%. Found: C, 74.8%; H, 10.05%; O, 10.96%; N, 4.62%.

We claim:

1. A lubricant composition comprising a major amount of a mineral lubricating oil and a minor amount, sufficient to inhibit the oxidative deterioration of said oil, of an amide of the general formula

wherein X represents an acyl radical of an aromatic orthohydroxy carboxylic acid whereas R stands for an aliphatic hydrocarbon radical and $R_1$ for a member of the group consisting of hydrogen and an aliphatic hydrocarbon radical.

2. Composition of claim 1 wherein R is an aliphatic hydrocarbon radical which is linked to N by a secondary carbon atom.

3. Composition of claim 1 wherein R is an aliphatic hydrocarbon radical which is linked to N by a tertiary carbon atom.

4. Composition of claim 1 wherein R is an aliphatic hydrocarbon radical which is linked to N by a secondary carbon atom positioned approximately in the middle of a chain of about 10–15 carbon atoms.

5. Composition of claim 1 wherein X is an acyl radical of an aromatic ortho-hydroxy carboxylic acid substituted by at least one member of the group consisting of halogen and an alkyl radical.

6. A lubricant composition comprising a major amount of a mineral lubricating oil and a minor amount, from 0.1–0.5% by weight of said oil, of an amide of the general formula

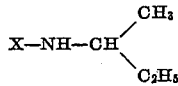

wherein X represents an acyl radical of an aromatic orthohydroxy carboxylic acid.

7. A lubricant composition comprising a major amount of a mineral lubricating oil and 0.1–0.5% by weight of said oil, of an amide having the general formula

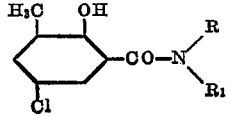

wherein R is an aliphatic hydrocarbon radical and $R_1$ is a member of the group consisting of hydrogen and an aliphatic hydrocarbon radical.

8. A lubricant composition comprising a major amount of a mineral lubricating oil and from 0.1–0.5% by weight of said oil, of an amide of the formula

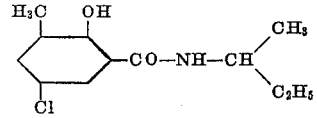

9. A lubricant composition comprising a major amount of a mineral lubricating oil and from 0.1–0.5% by weight of said oil, of an amide of the formula

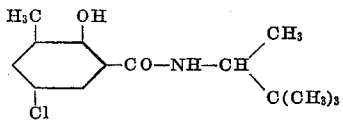

10. A lubricant composition comprising a major amount of a mineral lubricating oil and from 0.1–0.5% by weight of said oil, of an amide of the formula

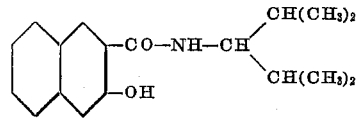

References Cited in the file of this patent

UNITED STATES PATENTS

| | | |
|---|---|---|
| 2,337,380 | Finley et al. | Dec. 21, 1943 |
| 2,366,074 | Wasson et al. | Dec. 26, 1944 |
| 2,401,957 | Pederson | June 11, 1946 |
| 2,403,067 | Fischer | July 2, 1946 |

FOREIGN PATENTS

| | | |
|---|---|---|
| 748,169 | Great Britain | Apr. 25, 1956 |